Jan. 16, 1968 J. A. CHARNOCK 3,363,907

VERTICAL RECORD PLAYER

Filed March 30, 1965 2 Sheets-Sheet 1

INVENTOR.
JOHN ANTHONY CHARNOCK
BY
Cavanagh & Norman

Jan. 16, 1968 J. A. CHARNOCK 3,363,907

VERTICAL RECORD PLAYER

Filed March 30, 1965 2 Sheets-Sheet 2

INVENTOR.

JOHN ANTHONY CHARNOCK

BY

Cavanagh & Norman

United States Patent Office 3,363,907

Patented Jan. 16, 1968

3,363,907
VERTICAL RECORD PLAYER

John Anthony Charnock, Don Mills, Ontario, Canada, assignor to Lorraine J. Croskery, Toronto, Ontario, Canada Filed Mar. 30, 1965, Ser. No. 443,991
8 Claims. (Cl. 274—10)

ABSTRACT OF THE DISCLOSURE

This discloses a vertical record player including three basic stations. These are: a magazine of records to be played and a feeding mechanism; a playing or turntable station; and a storage for played records. Inclined, gradually descending tracks connect the stations in a straight line, and include operating switches rendered effective by engagement of a record therewith. A drive is included which operates either the feed mechanism or the turntable. A pendulum type tone arm is swung into playing position by a drive from the turntable. An electric eye is associated therewith for controlling one phase of its movement. A clamping arm is provided for transferring a record from the track onto the turntable.

The invention relates to a record player of the type wherein the records are both stored and stacked in a substantially vertical plane.

Whereas the majority of domestic record players are designed to stack records in a horizontal plane and to transfer such records from the stack to a turntable for playing in a horizontal plane, the majority of coin operated commercial type record players store the records in a vertical plane and transfer them for playing to a turntable located in a horizontal plane. It is quite apparent that the domestic type of record player is bulky and wasteful of space and as a result it is commonly supplied as a separate article of furniture or alternatively, it can be built into existing furniture in some cases. The use of known coin operated record player designs in a domestic record player system would not achieve any significant reduction in the space occupied, and accordingly, no attempt has been made to do so. A further disadvantage of the domestic type of record player is that it is normally stood on the floor of a room either directly or resting upon another piece of furniture which is itself standing on the floor. As a result, any shocks which may be developed in the floor will be transmitted directly to the turntable and cause interference to be deveolped and in some cases even damaging the record and the needle. Obviously, this latter disadvantage could be overcome by hanging the record player on the wall out of contact with the floor but up until the present time record player designs have not permitted such a development due to the considerable width required to accommodate a turntable and a stack of records in a horizontal plane and the consequent strain such a bulky piece of equipment would apply upon any wall fixtures.

Accordingly, it is an objective of the present invention to provide a record player adapted for storing and playing the records in a substantially vertical plane which is economical in space, and adapted for installation on a wall mounting and for domestic use.

More particularly, it is an objective of the invention to provide a record player having the foregoing advantages wherein the records are moved towards the turntable by gravitational force and wherein the mechanism and moving parts required are reduced to a minimum.

More particularly, it is an objective of the invention to provide a record player having the foregoing advantages wherein the transmission of interference by shocks and otherwise to the record is substantially reduced by suspending the pick-up arm of the record player for playing somewhat in the manner of a pendulum.

The foregoing and other objectives will become apparent from the following description of a preferred embodiment of the invention which is given here by way of example only, and in which like reference devices refer to like parts thereof throughout the various views and diagrams, and in which.

Figure 1:
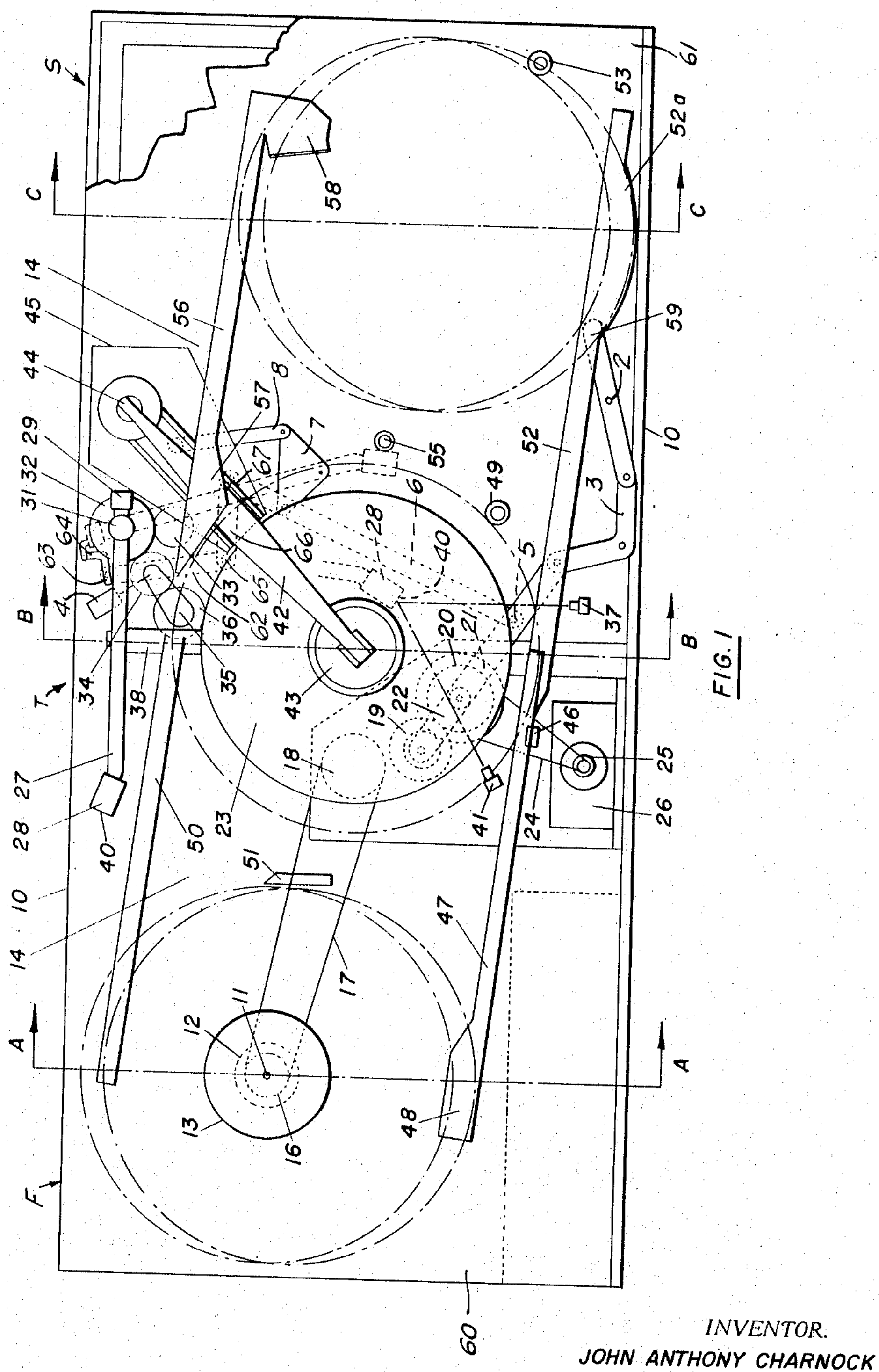
FIGURE 1 is a cut-away front elevation view with construction and mechanism shown.

The vertical record player according to this preferred embodiment of the invention comprises a rectangular shaped cabinet 10 having a length, height and thickness. The length of cabinet 10 has an approximate four foot dimension and a height dimension of not more than two feet. The thickness of cabinet 10 is sufficient to accommodate a stack of eight to ten records.

The invention may advantageously be described in its distinct stages, that is to say, a magazine and feed stage F, a turntable stage T and a storage stage S, through which records pass in sequence.

The feed stage F comprises essentially the archimedean screw 11 which is controlled by a feed clutch assembly 12 and equipped with a record rest plate 13. Attached to frame 14 is a bearing supporting a drive shaft (not shown) equipped with a pulley wheel 16. Pulley belt 17 runs between pulley wheel 16 and drive wheel 18 connecting the two together. Idler transfer wheel 19 is in constant frictional connection with friction drive 20 mounted on pulley wheel 21. Pivot bar 22 coaxial with drive 20 carries the transfer wheel 19 at one end and provides a swingable axis for connecting said wheel to either the turntable 23 or the drive wheel 18 therefore supplying power to rotate turntable 23 or feed clutch assembly 12. Pulley belt 24 runs from pulley wheel 21 to drive shaft 25 which is connected to electric motor 26.

The turntable stage T comprises essentially the tone arm 27 having tone head 28 and counter balance 29 swingably mounted to a shaft at pivot point 31. The shaft is equipped with a drive wheel 32 which is in constant frictional connection with reverse idler 33 and in releasable frictional connection with the forward idler 34. Pivot bar 35 is attached to forward idler 34 at one end and the other end thereof, is attached to drive transfer wheel 36 which is frictionally connected to turntable 23. Light source 37 is connected to frame 14 in such a position as to activate solenoid by photo-cell 41 with the light reflected from mirror 40 attached to tone head 28 onto photo-cell 41 for the rejecting of tone arm 27. A record tipping device 38 is located at the horizontal storage position of tone arm 27 and stationary to frame 14.

Figures 2, 3, 4:
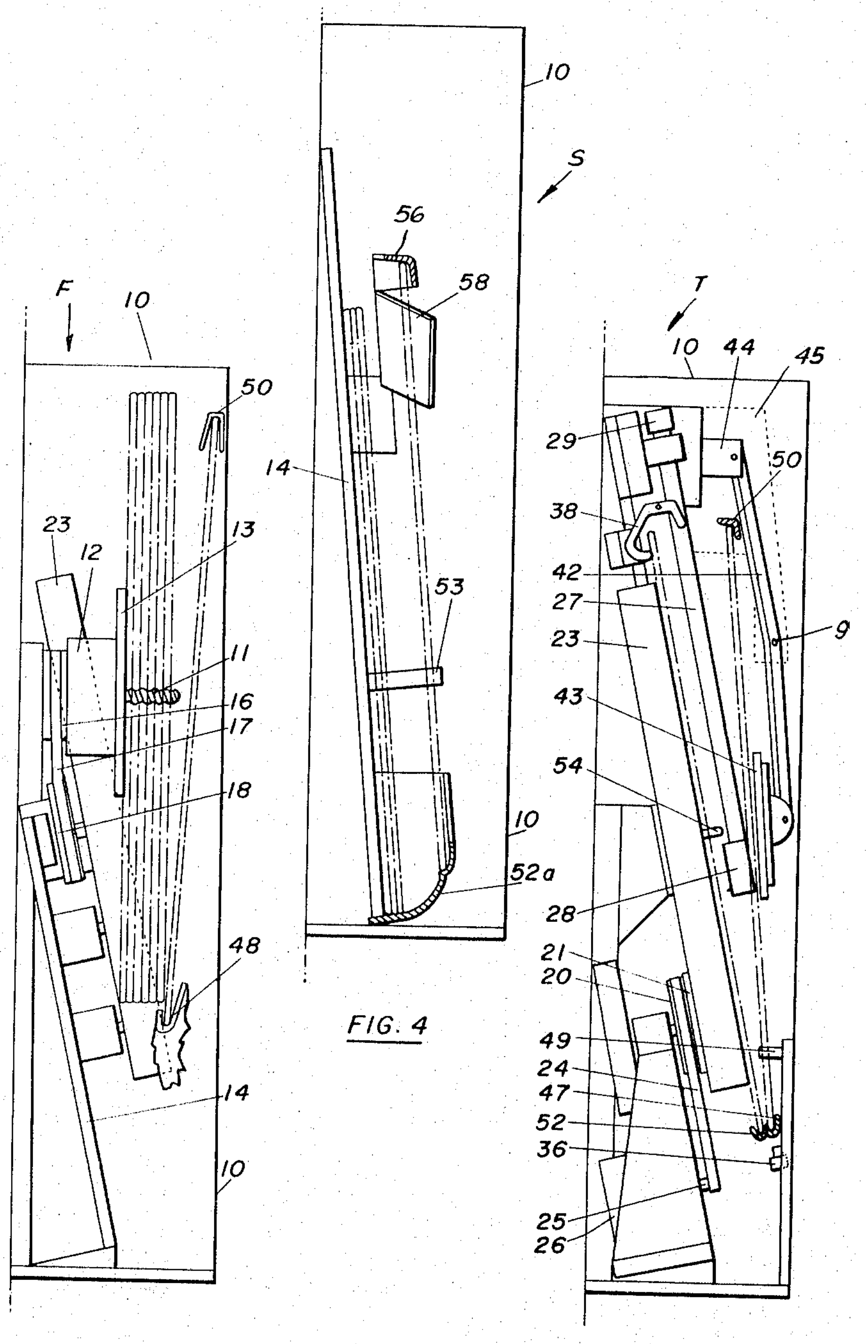
FIGURE 2 is a sectional view along the line A—A of FIGURE 1.
FIGURE 3 is a sectional view along the line B—B of FIGURE 1.
FIGURE 4 is a sectional view along the line C—C of FIGURE 1.

Solenoid operated clamping arm 42 is equipped with clamping head 43 and being hinge mounted at point 44 to solenoid housing 45 is activated by micro-switch 46 for assisting the record onto turntable 23. The arm 42 is pivotally mounted at 9 to housing 45 (FIGURE 3). Attached to solenoid mechanism in housing 45 is the mechanism which activates the clockwise rotation of turntable 23 and the resetting of the forward idler 34.

A significant feature of the present invention is the delivery of each record from the feed stage F to the turntable stage T and then to the storage stage S.

This preferred embodiment of the invention is equipped with a feed rail 47 and a guide rail 50 which are angled downwardly in such a manner as to establish a gravity feed path and allow the influence of gravity alone to carry the record therealong. Feed rail 47 is equipped with a loading plate 48 as part of the outside flange located at the record depositing area. The opposite end of rail 47 has a section cut-away from the inside flange to allow record placement on turntable 23. Connected to frame 14 and located near the end of feed rail 47 is stopping pin 49, which aligns the record with the turntable 23. Feed rail 47 and guide rail 50 are U-shaped to ensure a direct path to the playing position and to ensure a completely safe means of feeding, by having guide rail 50 off-set from that of feed rail 47, tilting the top of the record outwards as it descends to the playing position and having a section removed from each end of guide rail 50 for record placement. Located between feed rail 47 and guide rail 50 is restraining pin 51. Storage rail 52 and guide rail 56 are also angled downwardly to enable the influence of gravity to store the completed records. Storage rail 52 is located slightly lower than feed rail 47 and extends a short distance along the inside of rail 47. Stacking ramp 52*a* is connected to the opposite end of storage rail 52 and located above and beyond said ramp is stopping pin 53. Located in the centre of turntable 23 is turntable pin 54 which secures the record to turntable 23 also centrally located between rails 52 and 56 is descending tone arm stopping pin 55. Guide rail 56 is equipped with a catch plate 57 at one end and at the other end thereof a storage plate 58 for guiding the records onto ramp 52*a*. Restart switch lever 59 is located half-way down storage rail 52.

Cabinet 10 is open at each side thereof as at 60 and 61 to permit the placement or removal of stacks of records manually and is provided with a movable portion in the front thereof which may be either hingedly or slidably mounted to give access to the interior for changing of needles or rectifying any misfunction of the feed mechanism and held in position by a suitable locking means.

In operation, a stack of records are inserted manually through opening 60 and placed upon archimedean screw 11. The electric motor 26 is then manually switched on supplying the necessary power to rotate friction drive 20. This rotating action combined with transfer wheel 19 rotates drive wheel 18 which enables the feed clutch assembly 12 to rotate the archimedean screw 11 360° and deposit the outermost record into feed track 47. The 360° rotation also places the next record in the depositing area, the remaining records are held in alignment by restraining pin 51. As the record drops in feed rail 47 the guide rail 50 is engaged by the top of the record and assists the record as it rolls down to the playing position. Upon reaching the playing position the record is stopped in correct alignment with turntable 23 by stopping pin 49. The descending record, before stopping, trips the microswitch 46 and activates the solenoid operated clamping arm 42 which hinges at point 9 inwards, allowing the clamping head 43 to contact the centre surface of the record and carefully place the record on the turntable pin 54. Turntable 23 being on a 12° angle back from the vertical centre axis enables the pin 54 to be placed in the hole of the record easily. Upon placement of the record, the clamping arm 42 retracts to its storage position and activates the mechanism comprising link 8, bell crank 7, and connecting rod 6 which is pivotally connected at 5 to the arm 22 which places transfer wheel 19 against turntable 23 flange (as shown in FIGURE 1) and commences the clockwise rotation of the turntable. Drive transfer wheel 36, in contact with the outside edge of the turntable 23 flange and idler wheel 34 starts the track of the tone arm 27 down to the records edge where the tone arm 27 is stopped immediately over the edge of the playing surface of the record by stopping pin 55. The idler wheel 34 is then placed in a neutral position (means not shown). The tone head 28 is then engaged with the playing surface and the record is played. Upon completion of the record, the tone arm 27 is rejected at the correct moment by light source 37 reflecting from mirror 40 located on the end of the tone head 28 onto photo-cell 41. Light from source 37 then strikes photo-cell 41 which energizes the solenoid 4 assisted and places idler wheel 34 out of its neutral position and against the reverse idler wheel 33 which withdraws the tone arm 27 back to the horizontal position. Upon reaching the horizontal position transfer wheel 19 is disengaged from turntable 23 stopping its clockwise rotation, and the idler wheel 34 is returned to the neutral position (by means not shown). The return of tone arm 27 trips the record tipping device 38 which engages the top of the record, pushing it away from the surface of turntable 23. This action withdraws the record from the turntable pin 54 and drops the record into the storage rail 52, where guide rail 56 is engaged enabling the top of the descending record to tip out and then back as the playing surface of the record passes turntable pin 54, allowing no damage to be made to the playing surface. The record then rolls down the storage rail 52, over the restart switch lever 59 which has an end in storage rail 52 and is assisted by storage shield 58 and stopping pin 53 into the storage area. Restart switch lever 59 activated by the descending record causes transfer wheel 19 to drive wheel 18 through bell crank 3, pivot point 2 and arm 22 and places idler wheel 34 in the forward position against tone arm mechanism 32 and the complete cycle is reproduced. This movement of the idler wheel 34 is caused by a link 62 on which the idler wheel 34 is pivotally mounted coaxially with the bar 35. One end of the link 62 is pivotally connected at 63 to a bell crank 64. The other end of the link 62 is pivotally connected at 65 to another link 66 that is pivotally connected at 62 to the connecting rod 6. The bell crank 64 is pivotally mounted on the frame and the arm other than that to which the link 62 is connected is engaged by the counterbalance 29 when the tone arm 27 reaches the dotted line position of FIGURE 1. This engagement moves the idler wheel 34 out of engagement with the drive wheel 32. Upon completion of playing of the stack of records, opening 61 enables the stack of records to be removed manually.

The foregoing is a description of a preferred embodiment of the invention which is here made by way of example only. The invention is not to be taken as limited to the specific steps described but comprehends all such variations that come within the spirit and scope of the appended claims.

What I claim is:

1. In a vertical record player, a frame; a record magazine and feed mechanism comprising a substantially horizontal feed screw carried by said frame for receiving a plurality of records to be played, and a drive for said feed screw; a turntable mounted on said frame at one side of said magazine and having an axis tilted slightly from the horizontal and displaced at a level lower than said feed screw; inclined guide rails on said frame between said magazine and turntable for receiving an individual record from the feed screw and transferring it from the magazine to the turntable; a tone arm swingably mounted on said frame on a substantially horizontal axis; a pick up head on said tone arm engageable with a record on said turntable; a shiftable drive wheel; and means for moving said shiftable drive wheel into operative engagement with either said turntable or the drive for the feed screw.

2. The vertical record player of claim 1 together with a drive wheel coaxial with the mounting of said tone arm; a reverse idler in engagement with said tone arm drive wheel; a friction roll engaging said turntable; a friction drive roll in constant engagement with said friction roll and movable into positions engaging either said tone arm drive or said reverse idler; or to a neutral position; and means for moving said friction drive roll into any of said positions.

3. The vertical record player of claim 1 together with an electric motor mounted on said frame; and driving connections between said motor and said shiftable drive wheel.

4. In a vertical record player, a frame; a magazine and feed station including a substantially horizontal feed screw mounted on said frame for receiving a plurality of records to be played and a drive for said feed screw; a turntable station including a turntable mounted on said frame at one side of said magazine and feed station on a substantially horizontal axis lower than said feed screw; said turntable station including turntable drive means and a storage station at the other side of said turntable station and at a level lower than that of said turntable; said stations being substantially in lateral alignment; first inclined guide rails between said magazine and feeding station and said turntable; second inclined guide rails between said turntable and said storage station; any of said records, when on said first or second guide rails, being freely movable therealong; a drive for said feed screw which when effective transfers an individual record from said magazine to said first guide rails; a transfer mechanism for transferring a record from said first mentioned guide rails to said turntable; a pendulum tone arm swingably mounted on said frame; a pick up head on said tone arm engageable with a record on said turntable; a tone arm driving wheel; a record tipping device mounted on said frame for tipping a record on said turntable onto said second mentioned guide rails, and record actuated switches included in said guide rails for causing operation of said feed screw, turntable drive, transfer mechanism, and tone arm driving wheel in proper sequential order.

5. The vertical record player of claim 4 in which the transfer mechanism comprises a clamping arm pivotally mounted on the frame, a clamping plate on one end of said arm for engaging a record on the first mentioned guide rails and transferring it to said turntable; a solenoid operatively connected to the other end of said clamping arm, and connections between said solenoid and one of said switches.

6. The vertical record player of claim 4 together with a stop on said frame for limiting downward swinging movement of said tone arm whereby said pick up head is properly positioned to start the playing of a record on said turntable.

7. The vertical record player of claim 4 together with mechanism for actuating said tone arm drive to swing said tone arm upwardly; and means for rendering said mechanism effective upon completion of the playing of a record.

8. The vertical record player of claim 4 together with an electric motor on said frame; and driving connections between said motor and said feed screw drive, said driving connections being rendered effective by one of said switches as a played record approaches the storage station.

References Cited

UNITED STATES PATENTS

| | | | |
|---|---|---|---|
| 1,982,174 | 11/1934 | Nystrom | 274—10 |
| 2,007,054 | 7/1935 | Jones et al. | 274—10 |
| 2,009,806 | 7/1935 | Johnston | 274—10 |
| 2,056,372 | 10/1936 | Schwartz | 274—1 |
| 2,520,251 | 8/1950 | Mullaney | 274—1.11 X |
| 2,594,633 | 4/1952 | Freimann | 274—10 |
| 2,952,464 | 9/1960 | Stimler | 274—15 |

LEONARD FORMAN, *Primary Examiner.*

L. V. ANDERSON, *Assistant Examiner.*